(12) United States Patent
Lay (10) Patent No.: US 7,055,795 B2
(45) Date of Patent: Jun. 6, 2006

(54) DRIVE MECHANISMS FOR VALVE ACTUATORS

(75) Inventor: Stuart Masefield Lay, Chippenham (GB)

(73) Assignee: Rotork Controls Limited, Bath (GB)

( * ) Notice: Subject to any disclaimer, the term of this patent is extended or adjusted under 35 U.S.C. 154(b) by 35 days.

(21) Appl. No.: 10/827,500

(22) Filed: Apr. 19, 2004

(65) Prior Publication Data

US 2005/0012064 A1    Jan. 20, 2005

(30) Foreign Application Priority Data

Jul. 17, 2003    (GB) ................. 0316735.0

(51) Int. Cl.
*F16K 31/02* (2006.01)

(52) U.S. Cl. ............... 251/129.03; 251/129.11; 251/249.5; 192/20

(58) Field of Classification Search .......... 251/77, 251/129.03; 74/625; 192/20, 48.91, 95
See application file for complete search history.

(56) References Cited

U.S. PATENT DOCUMENTS 4,398,562 A * 8/1983 Saarem et al. ......... 137/625.47
4,429,591 A * 2/1984 Zuch et al. .................. 74/625
4,453,624 A * 6/1984 Graham ..................... 192/69.7

* cited by examiner

Primary Examiner—Edward K. Look
Assistant Examiner—John K. Fristoe, Jr.
(74) Attorney, Agent, or Firm—Bradley N. Ruben (57) ABSTRACT

The present invention provides a motorized valve actuator wherein the drive from the motor to the output shaft of the actuator is via a worm and worm wheel or other gear mesh which is incapable of being back driven, the actuator having an alternative manual drive, the manual drive comprising a hand wheel and a clutch and lever to change from motor power drive to hand drive mode, the actuator further having an intermediate shaft between the motor and output shaft, the hand wheel being carried by or at least operatively linked to the intermediate shaft to drive the intermediate shaft, the clutch mechanism being associated with/mounted on the intermediate shaft, the intermediate shaft being positioned between the motor and the worm/worm wheel drive whereby the clutch mechanism associated with/mounted on the intermediate shaft operates substantially freely when the lever is operated to bring the actuator into hand drive mode, the output shaft torque generated by the previous motor powered run and locked into the output shaft by the non-back driving worm/worm wheel mesh not being locked into the clutch mechanism.

20 Claims, 8 Drawing Sheets

DRIVE MECHANISMS FOR VALVE ACTUATORS

FIELD OF THE INVENTION

The present invention relates to drive mechanisms for transmitting a drive from a driving rotating member to a driven rotating member and particularly, but not exclusively, to mechanisms used for operating valves, sluices, penstocks and the like for controlling the flow of fluids. The term "fluids" in this context covers liquids, gases and vapors, and multi-state fluids such as liquids containing solids in suspension.

BACKGROUND OF THE INVENTION

In a typical example of an actuator drive designed to be used to operate a motorized valve, the driving member is an electric motor and the reduction drive to the driven shaft is in the form of a worm and worm wheel, the latter being keyed or otherwise fixed to the actuator output shaft or "column" which operates the moving element of the valve.

In valve actuation technology it is common practice to arrange the drive system such that only forces and torsion generated by the driving rotating member or members of the actuator can be transmitted through the gearing to the driven rotating member this is to eliminate the problem that can arise when no power is being provided to the driving member and the unbalanced forces generated by the pressurised fluid within the valve are sufficient, when acting on the valve moving member, to "back drive" the actuator gear train resulting in the valve moving member being displaced from its seating or from its last position in the fluid path determined by the last operation of the valve actuator.

One common method used to eliminate- the back driving possibility in an actuator gear train is to use a substantial reduction ratio on the worm/worm wheel mesh, the resulting low value of the worm lead angle combined with the normal friction coefficient at the meshing surfaces causing the drive to lock when torque is applied to the worm wheel side of the drive.

In a motorized valve this "locked in" torque remaining after a powered cycle operation can be considerable, particularly in valves where the moving member is forced on to a seat in order to eliminate fluid leakage between the upstream and downstream valve ports.

In order to be able to operate the valve in the event of a power failure or when installing or servicing the pipe line equipment, a two position clutch and a hand operated wheel are provided. These members are normally provided on the actuator output shaft which carries the worm wheel. The clutch is operated by a manual lever. The lever is spring biased to a parked position and the normal state of the drive mechanism is to be clutched into the power driving mode. Operating the lever over its full arc of travel uncouples the clutch moving member from the power driving position and moves it into the manual driving position. Simultaneously, the lever operates a latching mechanism which ensures that the clutch remains in the manual driving mode when the lever is released and returns to its parked position. The latching mechanism is so designed that it will hold the actuator in the hand drive state until the power drive is energised again. Rotation of the de-clutched member of the drive train then automatically releases the latch mechanism and allows the clutch moving member to return, under spring load, to its power driving position.

This automatic reversion to the power driving mode is a common feature of Valve Operation Technology and has come about to avoid the need to send operating staff out, sometimes long distances, to un-manned sites to attend to valve actuators which have been inadvertently left in manual drive mode after a service visit etc.

The high torque generated in the actuator output shaft and remaining locked into the shaft by the non-back-driving worm/worm wheel mesh generates high forces on the clutch engaging members when the said clutch members are mounted on the output shaft and so become part of the force/torsion path between the seated valve and the locked meshing teeth on the worm wheel. These relatively high torques and forces can cause difficulties to arise when trying to disengage the clutch from the power drive position.

Further, on large bore valves, where considerable forces need to be used to both seat and un-seat the valve, the output shaft mounted hand wheel as well as the lever used to uncouple the clutch from the power mode and move into hand drive mode need to be of substantial, all metal construction, adding considerably to the size and weight of the actuator.

A partial solution to this problem is revealed in U.S. Pat. No. 4,370,902 in which an additional spur gear reduction train is inserted between the worm wheel shaft and the actuator output shaft or column. This reduces the torsion on the worm wheel shaft approximately in proportion to the respective teeth numbers on the additional meshing spur gears but still leaves the torque from a seated valve spindle reduced by the gear drive ratio locked into the power drive side of the actuator clutch.

The present invention sets out to eliminate the locked in torque from the power driving side of the clutch assembly and to further reduce the operating torque required at the hand wheel so that, in addition to requiring less manual effort to operate the lever and hand wheel, the components that make up the clutch, lever and hand wheel assemblies can be reduced in size and, if required, can be manufactured from moldings made of plastic or reinforced plastic materials.

A typical existing method, used in Valve Actuation Technology to hold the actuator drive in hand mode after operating the lever, but automatically to change to power drive as soon as the drive motor starts to rotate, is achieved by providing a propping mechanism between one face of the worm wheel and the clutch moving member. This mechanism holds the clutch moving member in its hand drive position and compresses the spring means which urges the clutch moving member into its power driving position. The essential feature of the prop mechanism is a pivoted latch member which forms the end of the prop adjacent to the worm wheel. The latch member is provided with a light centering spring which holds the member at right angles to the worm wheel surface when the hand operation mode has been selected.

As soon as the worm wheel starts to rotate under power drive the friction between the wheel moving surface and the foot of the latch member overcomes the light centering spring means and causes the latch member to rotate approximately 90 degrees to a trailing, parallel position on the worm wheel surface. The resulting movement of the latch member pivot, in an axial direction relative to the worm wheel shaft is sufficient to allow the clutch moving member to engage power drive.

Whilst this existing automatic re-engaging to power drive arrangement is satisfactory, it does rely on the use of small wire centering springs which may fail in service.

Also the need to rely on surface friction between the latch member and the worm wheel surface in order to operate the mechanism results in the latch not being "positively locked" into the hand driving mode.

It is a further object of this invention to provide a latching mechanism for the automatic clutch re-engagement operation which does not rely on friction forces to release the latch and further, to provide a mechanism in which the latching member is not in contact with the rotating members of the drive when the clutch is in the power drive mode.

SUMMARY OF THE INVENTION

According to a first aspect of the present invention there is provided a motorized valve actuator wherein the drive from the motor to the output shaft of the actuator is via a gear mesh which is incapable of being back driven, the actuator having an alternative manual drive, the manual drive comprising a hand wheel and a clutch and lever to change from motor power drive to hand drive mode, the actuator further having an intermediate shaft between the motor and output shaft, the hand wheel being carried by or at least operatively linked to the intermediate shaft to drive the intermediate shaft, characterized in that the intermediate shaft is positioned between the motor and the gear mesh whereby when the lever is operated to bring the actuator into hand drive mode the clutch mechanism operates substantially freely, the output shaft torque generated by the previous motor powered run and locked into the output shaft by the non-back driving gear mesh not being locked into the clutch mechanism.

Suitably the non-back driveable gear mesh comprises a worm and worm wheel assembly and preferably the clutch mechanism is associated with/mounted on the intermediate shaft.

Preferably the actuator further has a gear reduction drive associated with the intermediate shaft to yet further increase the ease with which the output shaft of the actuator may be manually driven.

Since the actuator of the present invention has no locked in torque at the clutch to be overcome to disengage the clutch from the motor to instead engage the hand drive, and since the hand drive input torque required is reduced by the provision of the additional reduction drive between the intermediate shaft and the worm, at least one of and preferably each of the hand wheel, lever and certain clutch components may be formed of molded plastics materials.

As a result of its unique drive configuration, the actuator of the present invention may thus be constructed more cost effectively as well as being more compact, lighter and much easier to use than the existing actuators.

Further improvements to the actuator include forming the moving clutch member and co-operating clutch operator with cooperating conical surfaces whereby the clutch may be moved from motor drive engagement to hand drive engagement yet more easily. The sliding conical surfaces on the moving clutch member and the clutch operator are preferably configured with the clutch operator's conical surface wrapping at least partially round the moving clutch member's conical surface so that there is substantial area contact at the start of a de-clutching operation, the area rapidly diminishing towards a line contact as the clutch moving member rises to the hand drive position. Suitably the clutch operator's conical surface wraps up to 180 degrees round the moving clutch member's conical surface.

Preferably the actuator has a rotating cam member that is driven by the lever and which cooperates with the clutch operator in order to vary the mechanical advantage between the lever movement and the moving clutch member via the sliding conical surfaces. This cam member suitably provides a higher mechanical advantage at the start of a declutching operation in order to overcome the higher static friction coefficients and provides a lower mechanical advantage ratio or ratios for the remaining travel of the lever when operating against the relatively lower dynamic friction coefficients, the lower mechanical advantage ratio or ratios producing a smaller total angular travel of the lever.

Particularly preferably the lever's rotation axis is positioned parallel and adjacent to the hand wheel's rotation axis and suitably the lever has a curved shape and is configured to swing underneath the hand wheel circular periphery and partly surround the hand wheel boss, both these features being used to reduce the space required to accommodate the actuator when installed on the valve.

Preferably the actuator further comprises a latch member to latch the clutch in engagement for hand drive and suitably the latch member is provided with teeth, which teeth engage with teeth of a gear wheel of the drive train of the actuator to latch the actuator in its hand drive state, thereby providing a positive engagement when in hand-drive mode and a positively driven dis-engagement operation when returning to power drive mode.

Preferably the gear wheel is driven by the motor and associated with/mounted on the intermediate shaft, the gear wheel, by operation of the clutch, being selectively engageable with the intermediate shaft to drive the intermediate shaft.

Advantageously the latch member is pivoted and has adjacent thereto a flat spring means with which the latch member co-operates, the flat spring means serving to bias the latch member to pivot toward its hand drive engaged latch position.

Preferably the latch member is provided with a faceted boss and which boss co-operates with the flat spring means so that in a "trailing" disengaged position the latch member is positively held out of contact with the member with which it otherwise engages in its hand drive engaging latch position.

Suitably the latch member co-operates with the flat spring in order to provide three parked positions for the latch member, these being the two "trailing" positions depending on the direction of rotation of the gear wheel 29 and the central engaged position when the mechanism is latched in hand drive mode.

The faceted boss is preferably substantially rectangular/substantially square.

Suitably the latch member is pivotal and latch mechanism of the actuator further comprises at least one static post means to deflect the latch member to pivot positively from a disengaged "trailing" position substantially into the latched position and preferably there are a pair of spaced apart such static post means between which the latch member is moved as the lever is operated in order to move the latch member from either of two trailing positions.

Whereas the clutch has a moving clutch member, the intermediate shaft suitably has pinion gear teeth to co-operatively engage with a co-operating gear on a shaft for driving the worm/worm wheel, and the intermediate shaft suitably further has splines that cooperate with the moving clutch member whereby the moving clutch member is slidable longitudinally of the intermediate shaft but rotates therewith, the pinion gear teeth are particularly preferably extended longitudinally of the intermediate shaft whereby the splines are formed of these longitudinal extensions of the pinion gear teeth.

Preferably the longitudinal extensions of the pinion gear teeth on the intermediate shaft are cut back to a reduced diameter. The reduced diameter of the extensions provides a location on the intermediate shaft about which the gear wheel driven by the drive motor may freely rotate and also provides an abutment step serving as an axial location for the motor driven gear wheel, or for an interposing thrust washer.

In a further aspect of the present invention there is provided a motorized valve actuator of the type having an alternative manual drive, the manual drive comprising a hand wheel and a clutch and lever to change from motor power drive to hand drive mode, wherein the actuator comprises a latch member to latch the clutch in engagement for hand drive or motor drive, the latch member being provided with teeth which engage with teeth of a gear wheel of the drive train of the actuator in order to provide a positive engagement when in hand drive mode and a positively driven disengagement operation when returning to power drive mode.

BRIEF DESCRIPTION OF THE DRAWINGS

Some background technology and preferred embodiments of the invention will now be described, by way of example, with reference to the accompanying drawings and-diagrams in which.

DESCRIPTION OF THE PREFERRED EMBODIMENTS

Figure 1:
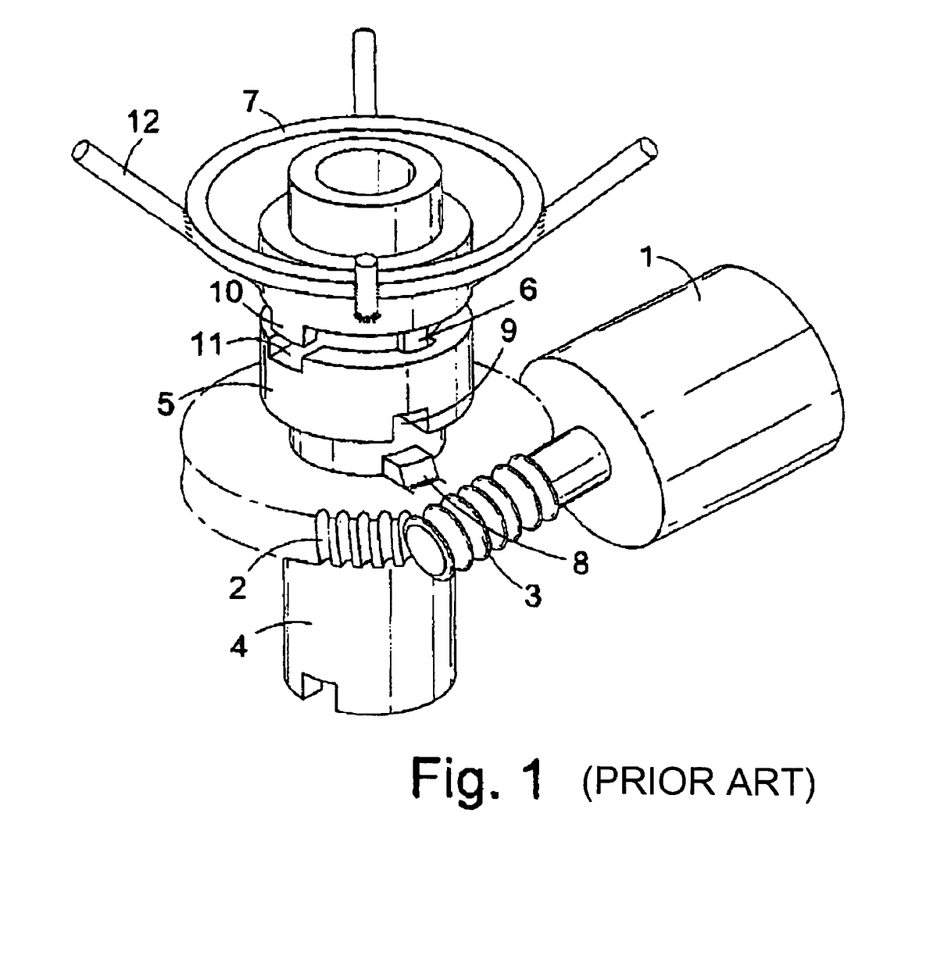
FIG. 1 illustrates the essential drive line features of a motorized valve actuator using the existing known technology.

Beginning with the prior art and referring firstly to FIG. 1, showing a simplified view of the drive line of a currently designed valve actuator, the electric motor 1 drives the worm wheel 2 by means of the worm 3. The worm wheel 2 is free to rotate on the actuator output shaft 4. A moving clutch member 5 is free to move axially on the output shaft 4 but is located radially on the shaft by the key or splines 6.

A hand wheel 7 is also mounted on the output shaft 4 being free to rotate independently of the shaft. The clutch moving member 5 can be moved into engagement with either the worm wheel 2 by means of the dogs 8 and slots 9 or into engagement with the hand wheel 7 by means of the dogs 10 and slots 11.

The lead angle on the worm 3, meshing with the worm wheel teeth, is normally sufficiently small to prevent back driving of the mechanism when torque is applied to the shaft 4. In this non-driving mode with the clutch moving member 5 still engaged with the dogs 8 on the worm wheel 2 the torque locked into the output shaft 4 is transmitted to the locking mesh of the worm wheel and worm via the dogs and slots 8 and 9. This results in a significant axial force being required to disengage the clutch from the power drive mode.

Following clutch disengagement from the power drive and movement into hand drive mode, the hand wheel 7 is then able to operate the valve via the actuator output shaft 4; the hand wheel torque required being equivalent to that supplied by the power drive. For this reason, on medium and large size motorized valve installations, the hand wheel has to be provided with extended spokes 12 to enable the operator to generate the significant manual torque required to operate the valve manually.

Figure 2:
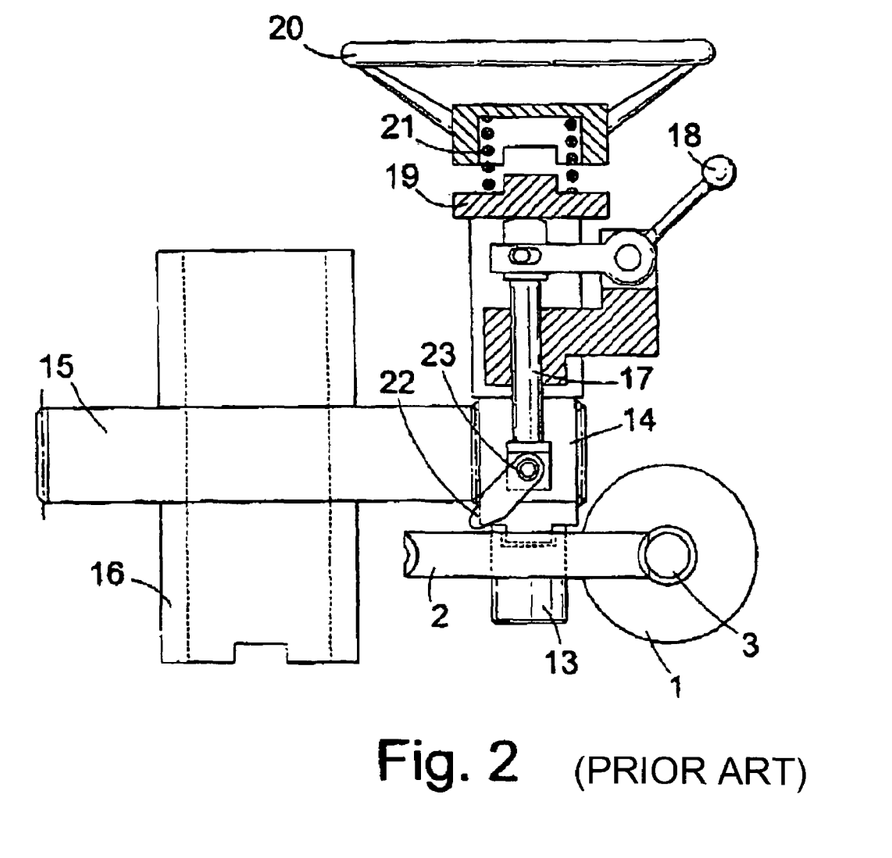
FIG. 2 shows the drive line features of a valve actuator referred to in U.S. Pat. No. 4,370,902. This drawing also shows, in simplified form, the automatic re-engaging clutch mechanism employing the existing known art.

FIG. 2 shows a known partial solution to the problem of reducing the hand wheel torque by placing the hand wheel drive with the associated clutch mechanism and the worm wheel on an intermediate shaft 13 carrying pinion gear 14 which meshes with a gear wheel 15 mounted on the actuator output shaft 16. FIG. 2 also shows one form of the known mechanism used for automatically re-engaging the power drive when the motor 1 is energized.

In this mechanism the axially movable shaft 17 is raised by the lever 18 to push the clutch moving member 19 out of engagement from the worm wheel 2 and into engagement with the hand wheel 20 and compressing the spring 21.

On the lower end of the shaft 17 is pivoted a latch member 22, shown in its trailing attitude with the clutch still engaging the worm wheel. This latch member is urged into a vertical position from either a left or right hand trailing position (depending on the rotation direction of the worm wheel) by means of a self centering wire torsion spring (not illustrated) surrounding the pivot 23.

With the electric motor 1 stationary and the lever 18 operated to bring the actuator into manual drive, the shaft 17 is raised allowing the latch 22 to rotate into its central position in axial alignment with the shaft 17. In this state the latch member 22 is acting as a "prop" holding the clutch moving member 19 into its hand drive mode via the shaft 17.

On restarting the motor 1 the friction force between the distal end of the latch member 22 and the rotating surface of the worm wheel 2 is sufficient to overcome the centering torque generated by the self centering spring at the pivot 23 causing the latch member to be rotated into one of its two "trailing" positions (depending on the direction of rotation of the worm wheel) and so allowing the shaft 17 and the clutch moving member 19 to descend into the power drive position under the action of the spring 21.

Figure 3:
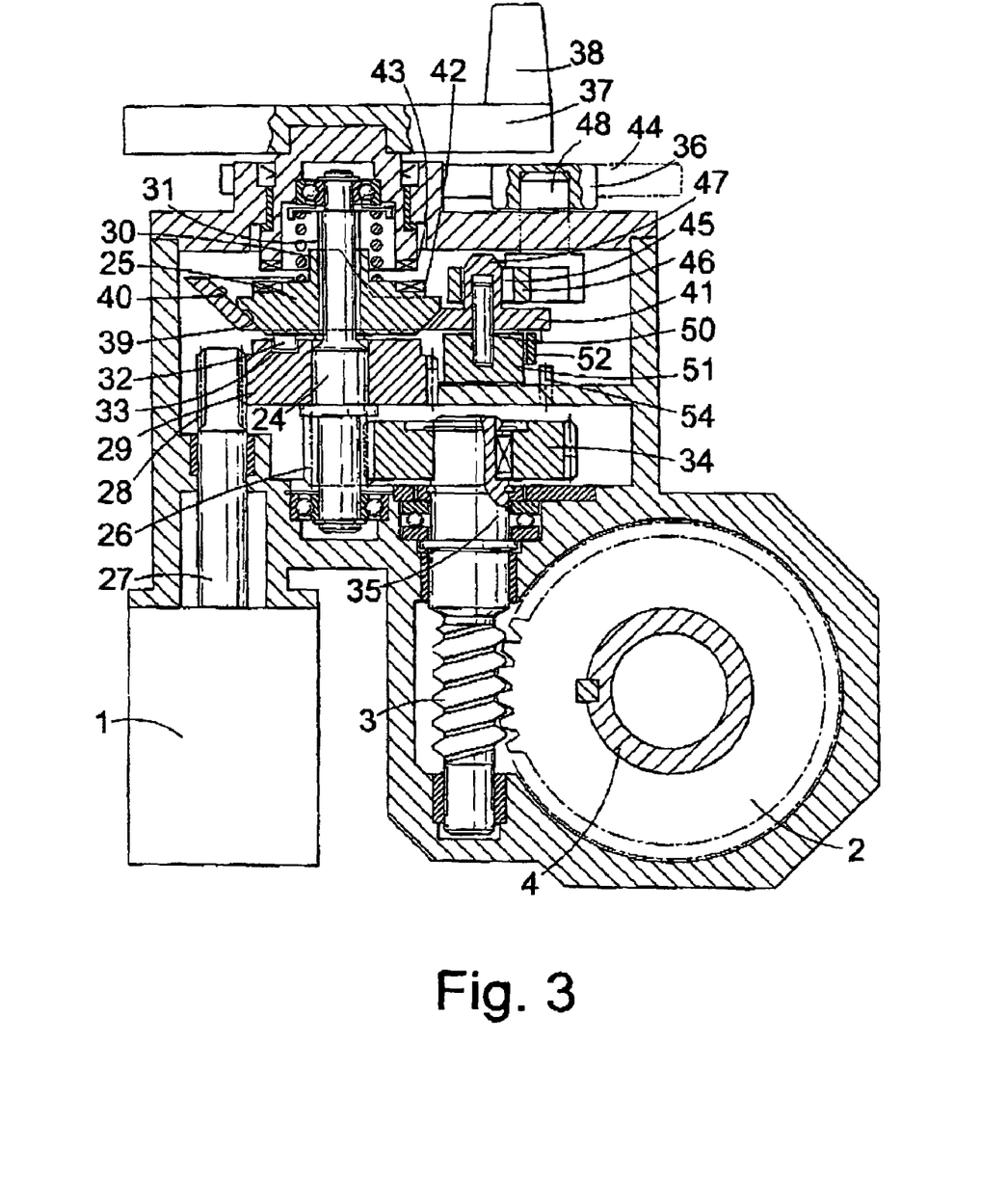
FIG. 3 is a sectional view of a motorized valve actuator, the subject of this invention, showing the principal drive line components including the clutch and clutch operating mechanisms. For clarity some of the rotating components have been shown in a single plane.
Figure 4:
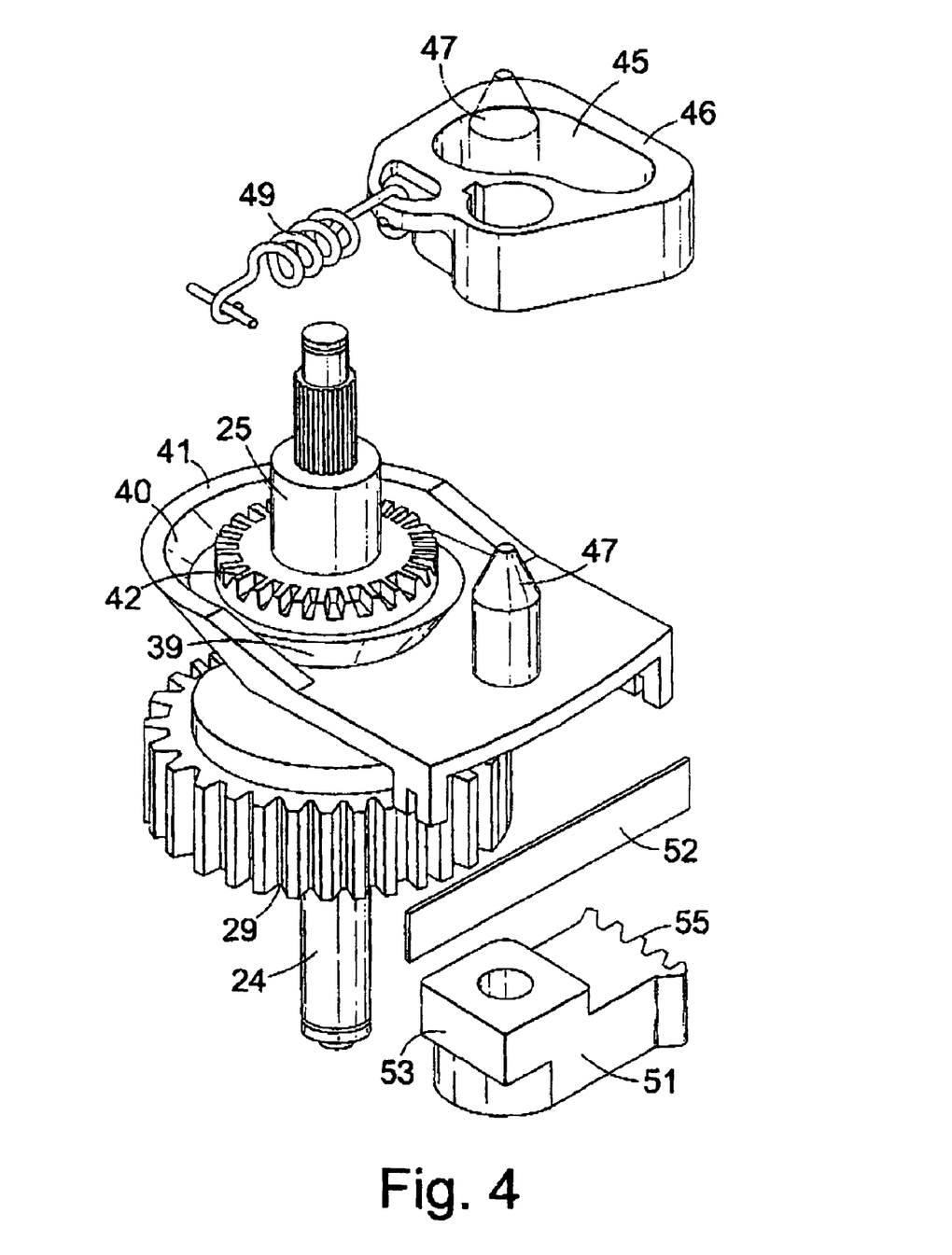
FIG. 4 is a partially exploded isometric sketch showing some of the components comprising the intermediate shaft with the adjacent clutch operating mechanism.

The various improvements to the actuator drive line assembly are illustrated in FIGS. 3 and 4, FIG. 3 being a semi-diagrammatic sectional view through the principal shaft centers of the drive and FIG. 4 showing an isometric, vertically exploded view of some of the components making up the clutch mechanism and which need further clarification. In the sectioned design illustrated, the intermediate shaft carries the moving clutch member 25 and is provided with an integral pinion 26. The motor shaft 27 has an integral pinion 28 which drives the gear wheel 29 also located—on the intermediate shaft 24 but free to rotate independently of the shaft 24.

The moving clutch member 25 is provided with splines 30 which cooperate with splines 31 allowing the moving clutch member to slide freely on the shaft 24 but to be fixed rotationally relative to the shaft. In the sectioned view, as drawn in FIG. 3, the moving clutch member 25 is in its descended power driving position with a protruding peg 32 cooperating with a circular hole or arc shaped blind slot 33 formed in the gear wheel 29. In this mode the motor 1 is able to drive the intermediate shaft 24 via the meshing pinion 28 and gear wheel 29 the torque being transmitted to the shaft 24 via the peg 32 cooperating with the hole or blind slot 33 and the splines 30 on the moving clutch member 25 meshing with the extended length splines 31 on the shaft 24.

The intermediate shaft 24 is permanently, drivably coupled to the actuator output shaft 4 via the pinion 26 meshing with the gear wheel 34 which, in turn, is keyed to the shaft 35 on which is machined the worm 3. The worm meshes with the worm wheel 2, the latter being keyed or otherwise permanently attached to the actuator output shaft 4.

One significant advantage of the actuator drive disclosed in FIG. 3 follows from the removal of the clutch assembly from the worm or wormwheel shaft to an intermediate shaft driving the said worm shaft 35 suitably through an intermediate gear reduction train (pinion 26 and gear wheel 34). Unlike the actuator drives illustrated in FIGS. 1 and 2, the locked in torque from the non-back-driving worm and worm wheel mesh is no longer transmitted via the clutch dogs and slots. Further, since the reduction drive from the motor to the intermediate shaft is via involute gear teeth (on pinion 28 and gear wheel 29) which can be back driven to rotate the motor 1 armature, none of the driving torque transmitted when in power drive mode can be left locked into the clutch dogs and slots when the power to the motor is switched off.

The disengagement of the clutch from power drive to hand drive mode can therefore be done without having to overcome any significant locked in forces in the gear train resulting from the previous power run cycle. As a consequence, the clutch assembly and the associated operating lever 36 can be made of light construction and, in particular, can make use of plastics moldings in place of the relatively heavy metal components in the designs depicted in FIGS. 1 and 2. The additional gear reduction drive via the intermediate shaft further enables the hand wheel assembly to be of lighter construction than that required in the designs shown in FIG. 1, enabling replacement of the extended spokes 12 and the large hand wheel 7 with the modest size, molded wheel 37 and turning handle 38.

Figure 7:
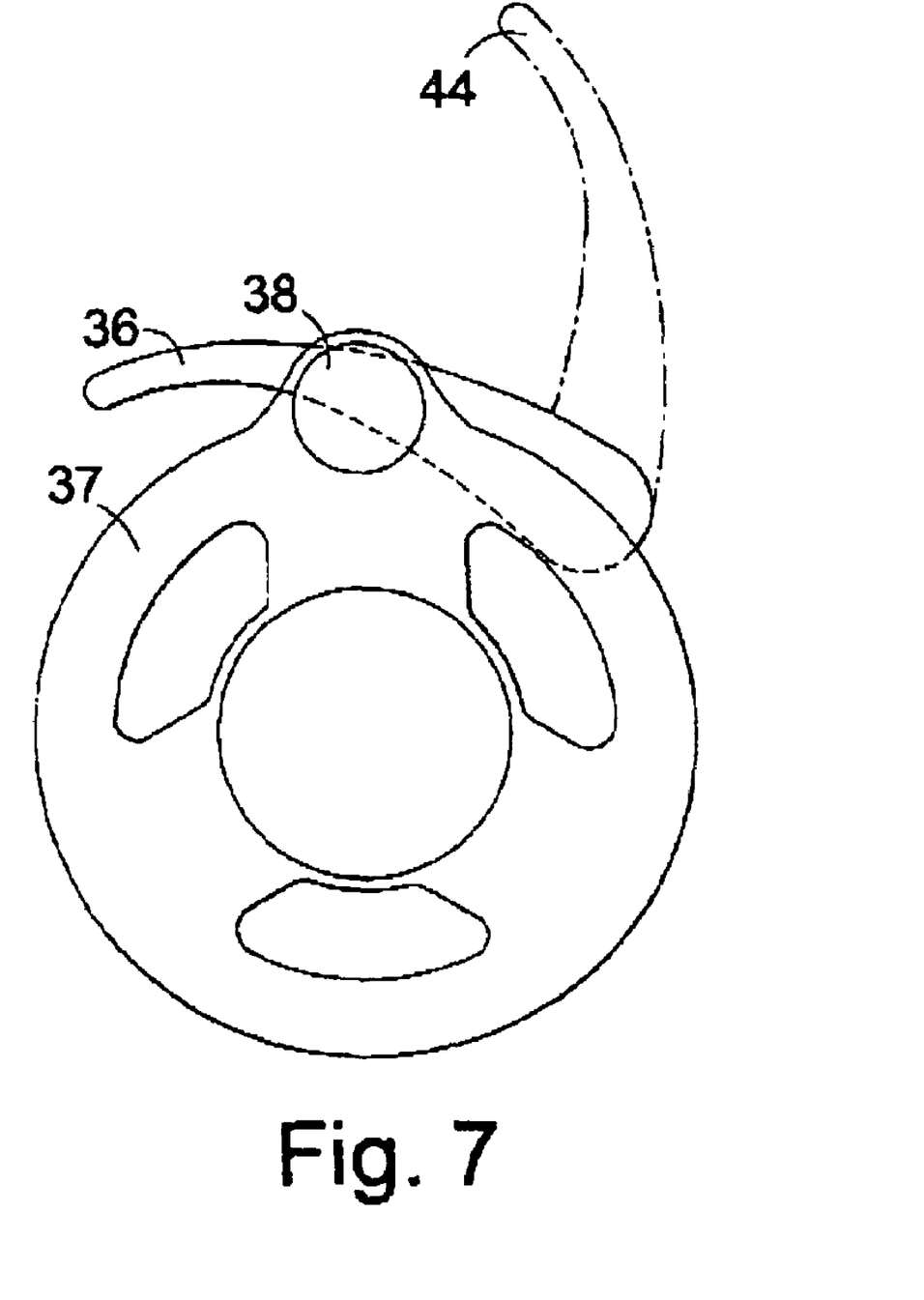
FIG. 7 is a view looking on to the face of the hand wheel with the adjacent clutch operating lever shown in both its parked and its operating positions.

In order to keep the actuator housing to the smallest dimensions possible and to be comparable with the reduced sizes achieved by the hand wheel and lever, a new compact design of clutch and lever assembly is revealed in FIGS. 3 and 4. A significant step in achieving this compact design is to arrange for the lever 36 rotation axis to be parallel and adjacent to the hand wheel 37 axis, the axes center distances being such that, if required, the lever axis can be positioned within the peripheral diameter of the hand wheel as shown in FIG. 7. The curved shape of the lever is a further feature of the compact design, the lever profile in its parked position curving round the hand wheel boss so that it is partly hidden beneath the hand wheel.

The means by which rotation of the lever 36 raises the moving clutch member 25 from its spring loaded power drive position is as follows.

The moving clutch member 25 is provided with a conical outer surface 39 which cooperates with an extended inner conical surface 40 of the clutch operator 41. The cone half angle is approximately 45 degrees as shown in FIG. 3: the surrounding clutch operator conical inner surface 40 is cut away as shown in FIG. 4, the "wrapping" angle surrounding the moving clutch member 25 being equal to, or less than 180 degrees in order to allow the clutch operator 41 to travel in a horizontal direction to the right as viewed in FIG. 3.

The clutch operator is constrained by the surrounding housing to move only in a single horizontal plane, the travel to the right being converted into an equivalent vertical lift of the moving clutch member 25 by the sliding action of the extended conical surface 40 on the surface 39, the vertical movement disengaging the power drive and engaging the set of radial face teeth 42 on the moving clutch member 25 with a cooperating set of teeth 43 on the hand wheel shaft assembly.

The movement of the lever 36 (clockwise as viewed in FIG. 7) from its parked position to its operating position 44 causes the clutch operator 41 to travel in its constrained horizontal direction by the action of the profiled slot 45 in the rotating cam member 46 on the integral post 47 molded on to the clutch operator 41. The cam member 46 is keyed, or otherwise attached, to the shaft 48 of the lever 36. The profiled slot 45 is so shaped that, from its parked position, a significant portion of the movement of lever 36 is used to provide a small initial deflection of the post 47 in order to increase the mechanical advantage of the lever/cam profile and so overcome the higher static friction force between the operating conical surfaces 39 and 40 at the start of a declutching operation.

Once movement starts, the friction coefficient between the lubricated conical surfaces will decrease to a value, typically about half the static value coefficient enabling a lower mechanical advantage to be used for the remainder of the lever 36 travel.

It should be understood that the male cone surface 39 and its cooperating half circular surface 40 are only in full surface contact at the start of a power declutching operation. This allows the maximum available contacting surface area to be used with consequent minimum surface contact pressure when overcoming the force generated by the higher static friction. As soon as the clutch operator 41 starts to move and the moving clutch member rises, the surface area in contact rapidly starts to diminish because horizontal (as drawn in FIG. 3) sections taken through the contacting cones will show, in theory, circles of different diameters in line contact. In practice the surface deflection produced by the operating forces will provide a narrow width contact area in place of the theoretical line contact of the two moving conical surfaces.

The lever 36 is spring biased so that, on release, it returns to the parked position partly shielded by the overhanging hand wheel 37. Referring to FIG. 4, this is achieved, typically, by means of a coil tension spring 49, one end being anchored to the actuator housing and the other end being attached to the cam member 46 at a position such that the spring tension force produces the return travel torque on the cam member 46 and thence to the lever 36 via the lever shaft 48.

Figure 5:
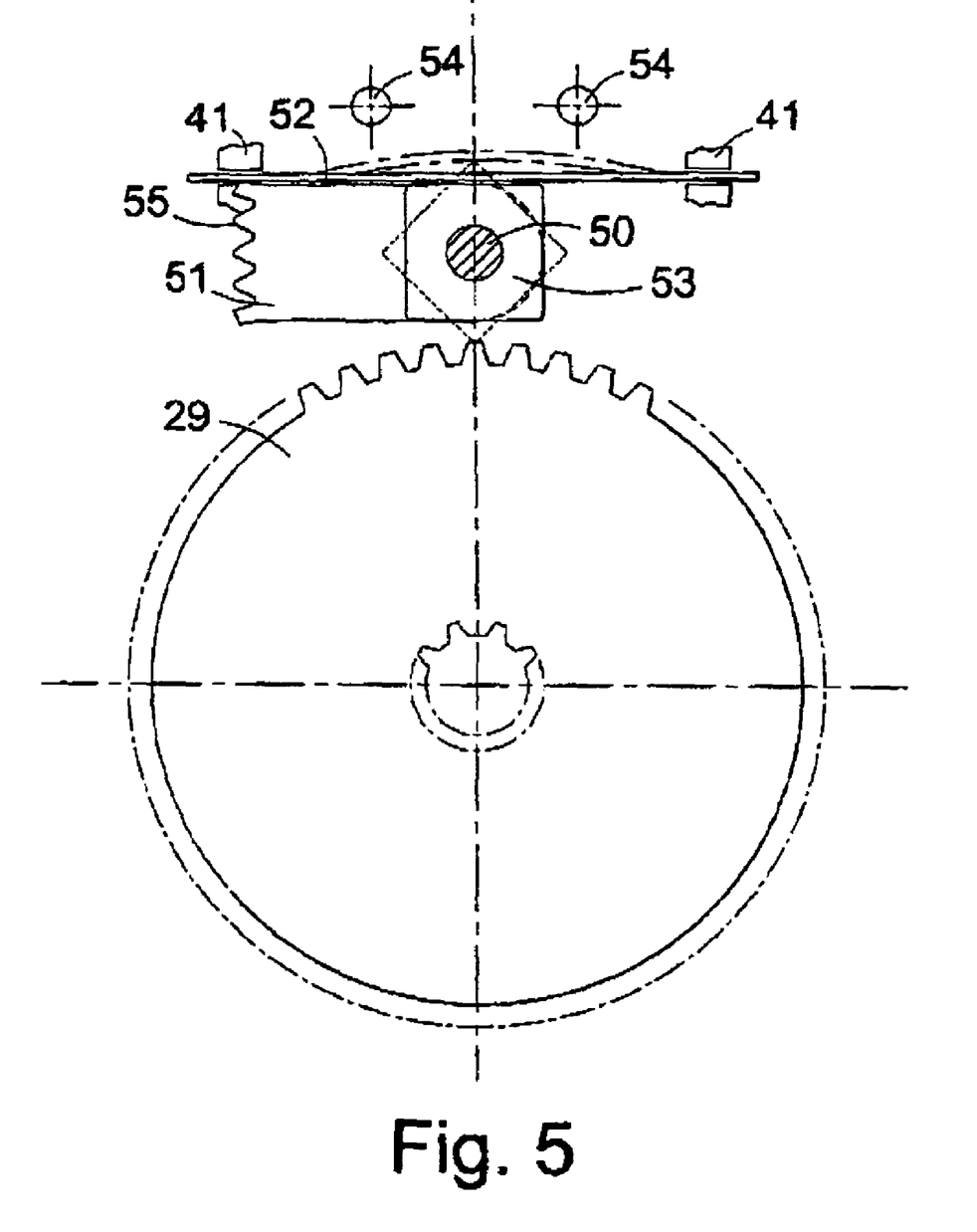
FIG. 5 shows the actuator components that comprise the latching and automatic release feature of the clutch, the said components relative positions corresponding to the actuator being in the power drive mode.
Figure 6:
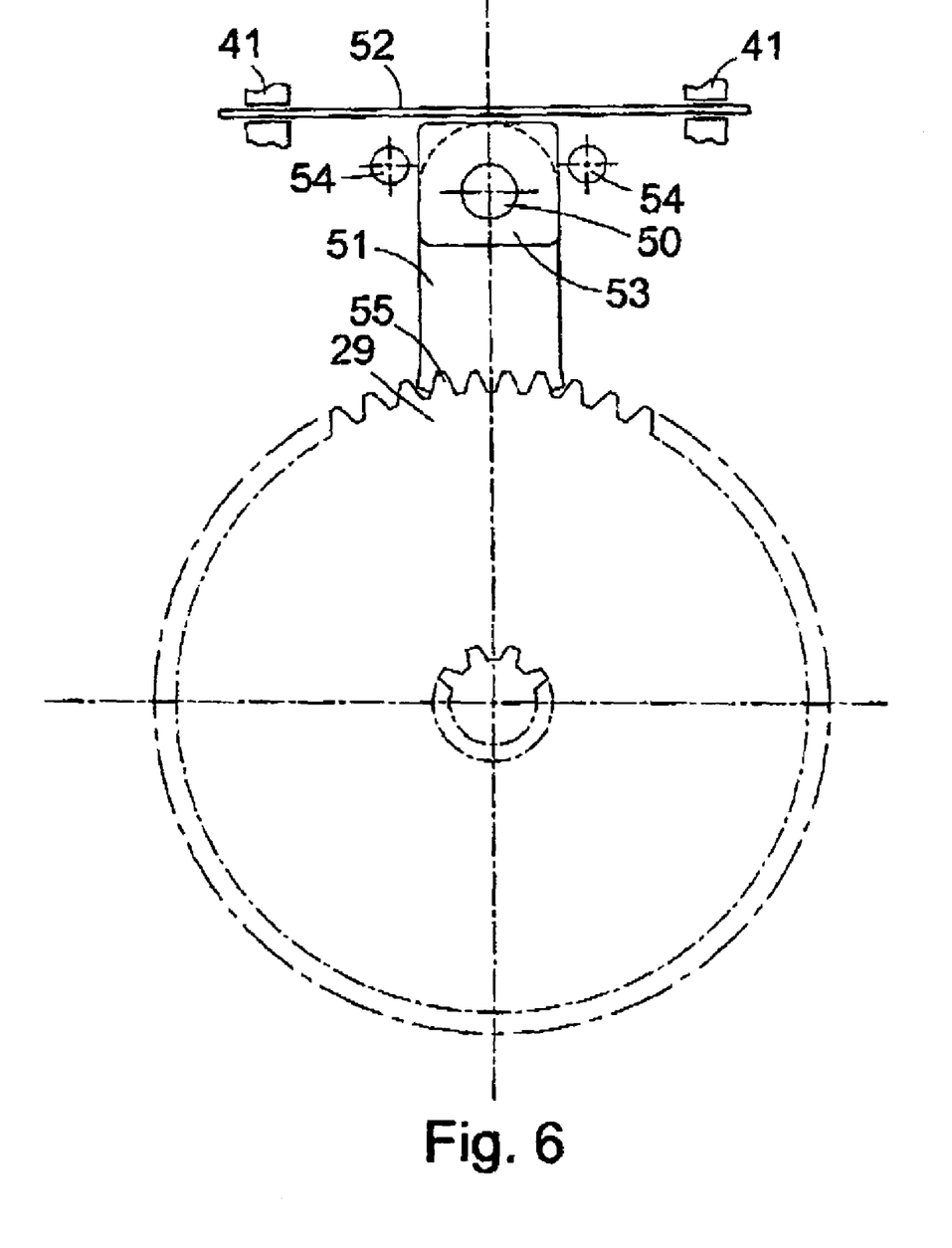
FIG. 6 illustrates the same components as in FIG. 5 but with their relative positions corresponding to the actuator being in the hand drive mode.

The principal components of the new design latching system are also illustrated in FIGS. 3 and 4 with diagrams, FIGS. 5 and 6, showing the relative positions of the latching components in their unlatched (power drive) and latched (hand drive) states respectively.

The post 47 is provided with a hole in its base into which is inserted a small shaft 50 acting as a pivot for the new design latch member 51: this last component operates in the same manner as the known component 22 in FIG. 2 but provides significant improvements.

In the non-latched power drive mode (FIG. 5) the latch member 51 is held clear of the gear wheel 29 by the action of the flat spring 52 which holds the latch member in one of three angular positions 90 degrees apart by cooperating with the sides of a square boss 53 surrounding the pivot center. This arrangement provides three definite parking positions at 90 degree intervals, the central position being the "latched" state.

The flat spring ends are located by slots, or other means, in the clutch operator 41 and therefore stay in the same position relative to the pivot and shaft 50 during a de-clutching operation. During this operation the latch member 51 is forced to rotate through nearly 90 degrees by being withdrawn between the two posts 54 located in the actuator housing. The final angular travel to the latched position is achieved by the flat spring 52 being first deflected by the corner of the rotating square boss 53, shown chain dotted in FIG. 5, and then returning to it's initial flat position forcing the latch member the final few degrees into the position shown in FIG. 6. In order to achieve this final latched position, the horizontal travel has to be a little longer than the distance between latched and unlatched positions. This is to allow the teeth 55 on the latch member to pass over the teeth on the gear wheel 29 before engagement.

The return to power drive mode is initiated by the rotation of the gear wheel 29 driven by the motor 1. The latch member 51 now rotates, being in mesh with the engaged teeth of the gear wheel, and so allowing the clutch operator 41 to return towards the power drive mode position. The final few degrees of rotation cause the latch member 51 to "spring" into the FIG. 5 position with all the latching teeth 55 held clear of the gear wheel teeth.

Important advantages of this design of latching mechanism with the associated automatic release feature over the known mechanisms used in valve actuator technology are listed below:

1) The latch member 51 is positively located against the gear wheel 29 in the latched (hand drive) condition and is positively driven to its non-latched position when the gear wheel starts to rotate. There is no reliance, therefore, on rubbing, friction generating components in order to secure a change from hand drive to power drive.

2) In power drive and the motor operating, the latch member 51 is held clear of the rotating gear wheel 29. This is a significant improvement on the known mechanism where the trailing latch lever is in continuous sprung contact with the worm wheel adding slightly to power drive friction; but, more importantly, producing wear debris which may eventually contaminate the lubricating oil over a long running period.

3) The rotation of the latch member 51 from the power drive mode to (engaged) hand drive mode is achieved primarily by the arrangement wherein the latch member passes between the two posts 54 and is deflected. This is a more positive operation than relying on the known method of using a self centering wire spring to achieve the change to a latching position. Use of spring 52 to complete the last few degrees of the 90 degree rotation of the latch member completes the positive latching operation while safeguarding against risk of "locking" of the latch 51 in hand drive by the posts 54.

Figure 8:
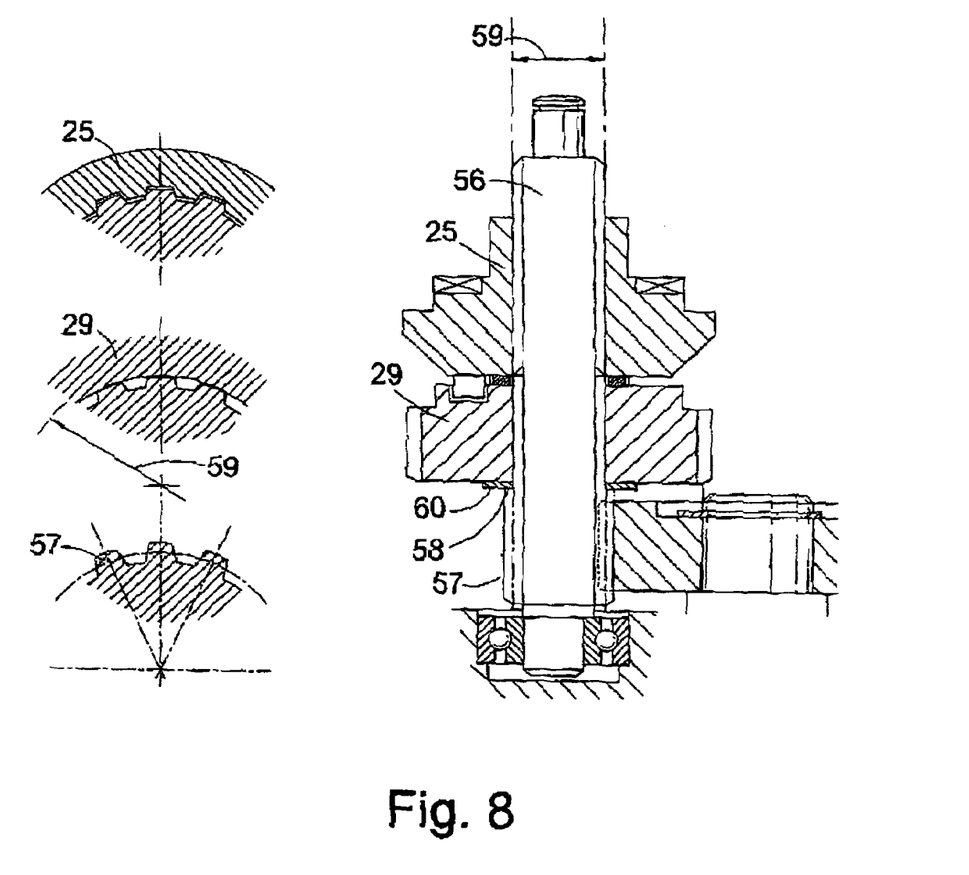
FIG. 8 shows an embodiment involving the intermediate shaft in which the integral driving pinion gear on the shaft is extended and further machined to form the splines which locate, radially, the moving clutch member.

An alternative embodiment of the invention aimed at reducing the costs of manufacture of the intermediate shaft 24 is illustrated in FIG. 8.

Referring firstly back to FIG. 3, the shaft 24 shown in FIG. 3 carries an integral meshing pinion 26 having teeth of standard involute form and an upper, as drawn, male spline section 31 which cooperates with the splined bore of the moving clutch member 25. Apart from the additional tooling costs in having different sets of teeth (pinion and splines) the enlarged central diameter on which the shaft 24 can rotate relative to the gear wheel 29 (in hand drive) prevents the use of a through broaching operation when forming the teeth.

Referring to FIG. 8, the intermediate shaft 56 carries only one set of gear teeth which are extended to form the driving pinion at the lower end of the shaft as drawn. An abutment step 58 is formed on the shaft by machining down the teeth, typically to a diameter 59 approximately equivalent to the involute gear circular pitch diameter; that is machining off the gear teeth addendum.

The bore of the moving clutch member 25 can now be machined out to form a cooperating splined hole to slide on the cut down teeth on the shaft 56 as shown in the upper local transverse section. The gear wheel 29 can rotate over the cut down teeth as shown in the middle local section in FIG. 8. A thrust washer 60 may be interposed between the abutment step 58 and the moving clutch member 25. The shaft 56 only rotates at relatively slow speed within the gear wheel 29 and without transmitting any torque to the wheel when the actuator is in hand drive so there will be no significant wear due to the interrupted circular contacts between the gear wheel and the shaft.

The invention claimed is:

1. A motorized valve actuator wherein the drive from the motor to the output shaft of the actuator is via a gear mesh which is incapable of being back driven, the actuator having an alternative manual drive, the manual drive comprising a hand wheel and a clutch and lever to change from motor power drive to hand drive mode, the actuator further having an intermediate shaft between the motor and output shaft, the hand wheel being carried by or at least operatively linked to the intermediate shaft to drive the intermediate shaft, characterized in that the intermediate shaft is positioned between the motor and the gear mesh whereby when the lever is operated to bring the actuator into hand drive mode the clutch mechanism operates substantially freely, the output shaft torque generated by the previous motor powered run and locked into the output shaft by the non-back driving gear mesh not being locked into the clutch mechanism, wherein the clutch comprises a moving clutch member and a co-operating clutch operator having co-operating conical surfaces.

2. A motorized valve actuator as claimed in claim 1, wherein the non back driveable gear mesh comprises a worm and worm wheel assembly.

3. A motorized valve actuator as claimed in claim 1, wherein the clutch mechanism is associated with/mounted on the intermediate shaft.

4. A motorized valve actuator as claimed in claim 1, wherein the actuator has a gear reduction drive associated with the intermediate shaft.

5. A motorized valve actuator as claimed in claim 1, wherein at least one of the hand wheel, lever and one or more clutch components is formed as a plastics molding.

6. A motorized valve actuator as claimed in claim, 1 wherein the sliding conical surfaces on the moving clutch member and the clutch operator are configured with the clutch operator's conical surface wrapping at least partially around the moving clutch member's conical surface so that there is substantial area contact at the start of a de-clutching operation, the area rapidly diminishing towards a line contact as the clutch moving member rises to the hand drive position.

7. A motorized valve actuator as claimed in claim 1, wherein the actuator has a rotating cam member that is driven by the lever and which cooperates with the clutch operator in order to vary the mechanical advantage between the lever movement and the moving clutch member via the sliding conical surfaces.

8. A motorized valve actuator as claimed in claim 1 wherein the lever's pivoting axis is positioned parallel and adjacent to the hand wheel's rotation axis.

9. A motorized valve actuator as claimed in claim 8, wherein the lever has a curved shape and is configured to swing underneath the hand wheel circular periphery and partly surround the hand wheel axle.

10. A motorized valve actuator as claimed in claim 1, wherein the actuator further comprises a latch member to latch the clutch in engagement for hand drive.

11. A motorized valve actuator as claimed in claim 10, wherein the latch member is provided with teeth, which teeth engage with teeth of a gear wheel of the drive train of the actuator to latch the actuator in its hand drive state, thereby providing a positive engagement when in hand drive mode and a positively driven dis-engagement operation when returning to power drive mode.

12. A motorized valve actuator as claimed in claim 11, wherein the gear wheel is driven by the motor and associated with/mounted on the intermediate shaft, the gear wheel, by operation of the clutch, being selectively engageable with the intermediate shaft to drive the intermediate shaft.

13. A motorized valve actuator as claimed in claim 10, wherein the latch member is pivoted and has adjacent thereto a flat spring means with which the latch member co-operates, the flat spring means serving in one state to bias the latch member to pivot toward its hand drive engaged latch position.

14. A motorized valve actuator as claimed in claim 13, wherein the latch member is provided with a faceted boss and which boss co-operates with the flat spring means so that in a "trailing" disengaged position the latch member is positively held out of contact with the member with which it otherwise engages in its hand drive engaging latch position.

15. A motorized valve actuator as claimed in claim 10, wherein the latch mechanism of the actuator further comprises at least one static post relative to which the latch member is moved as the lever is operated in order to pivot the latch member positively from a "trailing" position substantially into the latched position.

16. A motorized valve actuator as claimed in claim 15, wherein the latch mechanism has a pair of spaced apart static pegs between which the latch member is moved as the lever is operated in order to rotate the latch member positively from either of two "trailing" positions substantially into a central latched position.

17. A motorized valve actuator as claimed in claim 15, wherein the longitudinal extensions of the pinion gear teeth on the intermediate shaft are cut back to a reduced diameter.

18. A motorized valve actuator as claimed in claim 1, the clutch comprising a moving clutch member, the intermediate shaft having pinion gear teeth to co-operatively engage with a co-operating gear of a shaft for driving the worm/worm wheel, the intermediate shaft further having splines that cooperate with the moving clutch member whereby the moving clutch member is slidable longitudinally of the intermediate shaft but rotates therewith, wherein the pinion gear teeth are extended longitudinally of the intermediate shaft whereby the splines are formed of the longitudinal extensions of the pinion gear teeth.

19. A motorized valve actuator of the type having an alternative manual drive, the manual drive comprising a hand wheel and a clutch and lever to change from motor power drive to hand drive mode, wherein the actuator comprises a latch member to latch the clutch in engagement for hand drive or motor drive, the latch member being provided with teeth which engage with teeth of a gear wheel of the drive train of the actuator in order to provide a positive engagement when in hand drive mode and a positively driven dis-engagement operation when returning to power drive mode.

20. A motorized valve actuator of the type having an alternative manual drive, the manual drive comprising a hand wheel and a clutch and lever to change from motor power drive to hand drive mode, wherein the actuator comprises a latch member to latch the clutch in engagement for hand drive or motor drive, the latch member being deflected to turn to its latched hand drive position by a fixed post relative to which the lever is moved, a spring means being provided adjacent to the latch member to bias the latch member to turn more fully into its hand drive engaged latched position.

* * * * *